UNITED STATES PATENT OFFICE 2,611,307

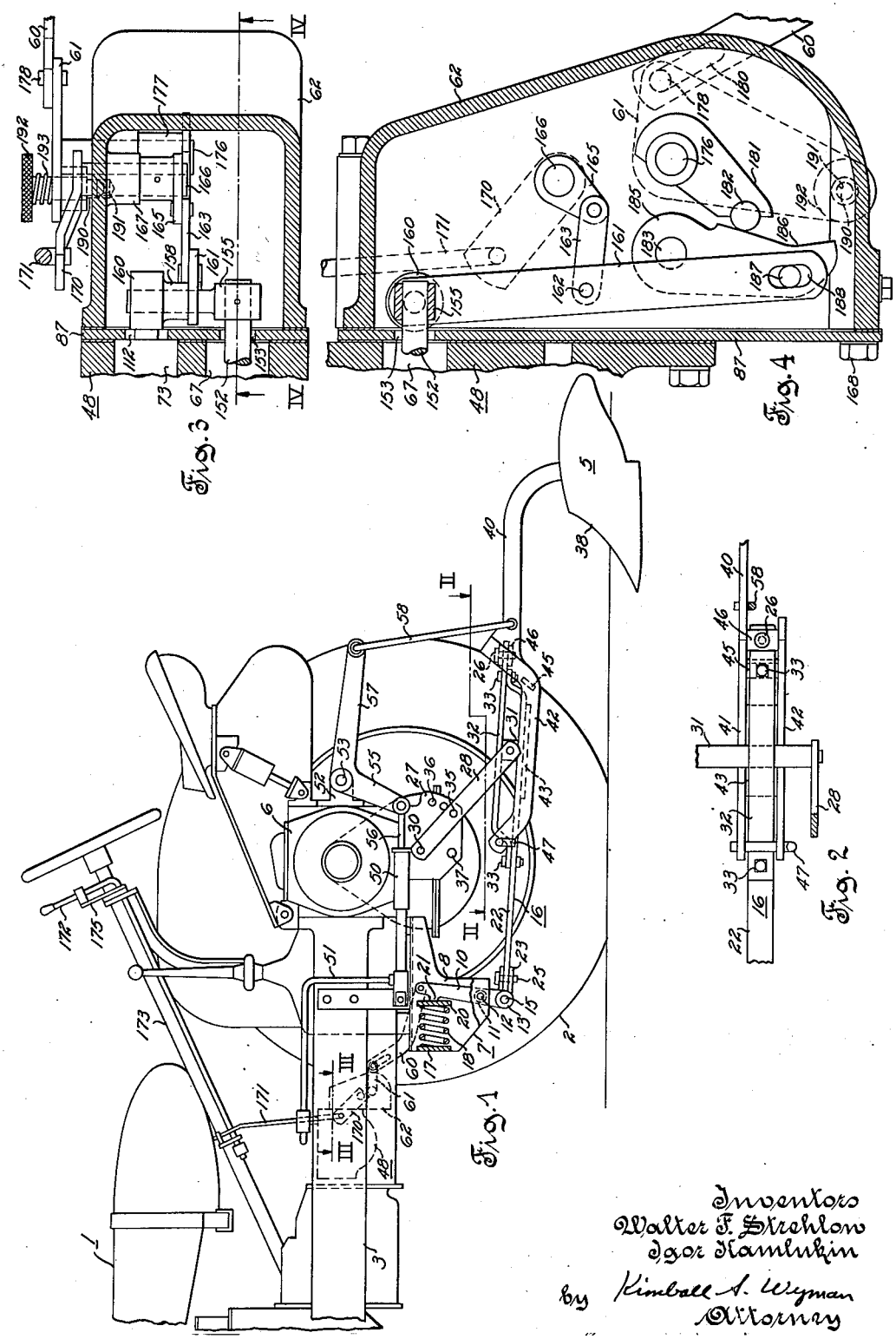

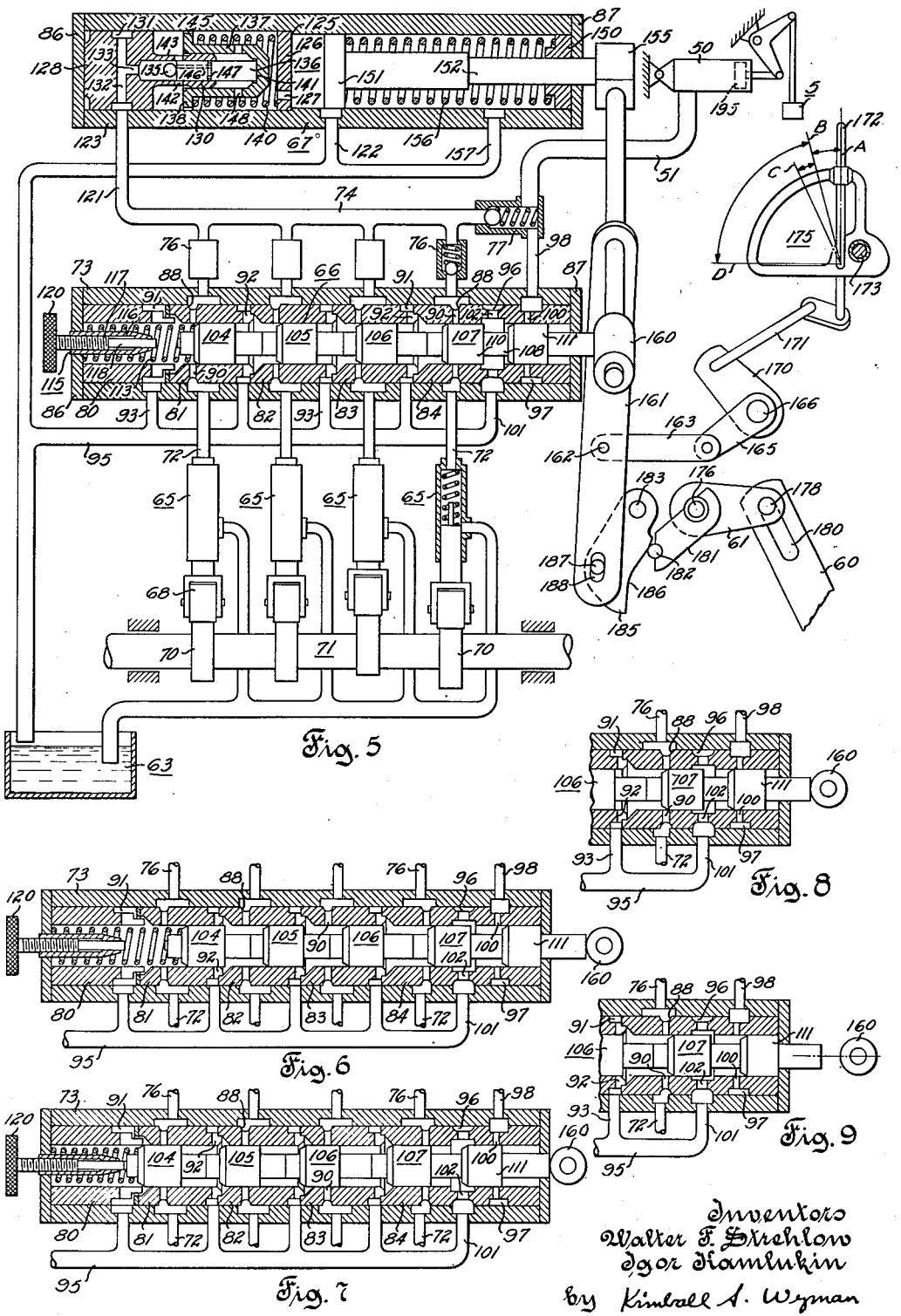

CONTROL LINKAGE FOR HYDRAULIC DRAFT REGULATION OF VEHICLE PROPELLED IMPLEMENTS

Walter F. Strehlow, Wauwatosa, and Igor Kamlukin, Milwaukee, Wis., assignors to Allis-Chalmers Manufacturing Company, Milwaukee, Wis., a corporation of Delaware Application August 23, 1948, Serial No. 45,684

10 Claims. (Cl. 97—50)

This invention relates to mechanical movements generally and is more specifically directed to a connecting linkage having particular utility, although not limited in its application, with respect to a hydraulic control system affording automatic draft regulation of a vehicle propelled implement; certain features herein shown and described but not claimed are disclosed and claimed in our copending application Ser. No. 26,516, filed May 12, 1948, Hydraulic Apparatus with Variable Discharge of Pressure Maintaining Fluid.

It is an object of this invention to provide in a hydraulic control system a connecting linkage constructed and arranged to transmit movement from a force responsive part to a pump regulating valve in an improved manner such that as the force on said part increases the resulting movement of the valve decreases.

Another object of this invention is to provide a linkage which transmits movement of a force responsive movable part to a hydraulic pump control valve and which linkage includes an element arranged in a novel manner so as to move in spaced relation to said valve through one predetermined range and also move with said valve through another predetermined range.

It is a further object of this invention to provide an apparatus for controllably shifting the position of a device through the operation of means including a pump, valve and a force responsive part wherein the part and valve are connected through an improved linkage affording movement of said valve in response to movement of said part and including a lockout means positionable to render said linkage ineffective to transmit movement of said part to said valve.

A still further object of the present invention is to provide an apparatus for controllably shifting the position of a device through the operation of means including a pump, valve, pump unloading means, manual control lever and a force responsive part wherein the part, control lever, valve and unloading means are connected through an improved linkage including the lockout means mentioned hereinbefore, and wherein said linkage affords movement of said valve in response to either actuation of the control lever or the pump unloading means when the lockout means is employed to prevent response to draft.

An additional object of this invention is to provide a connecting linkage for use in a hydraulic control system which is simple, compact and relatively inexpensive to manufacture and service and/or which is inherently capable of accomplishing one or more of the above stated objects.

The construction and operation of apparatus capable of accomplishing the above stated objects will become readily apparent as the disclosure progresses and particularly points out the various advantages and features considered of special importance. And accordingly, the present invention may be considered as comprising the various features of construction, combinations and subcombinations of elements or parts as is hereinafter more fully set forth in the detailed description and appended claims, reference being had to the accompanying drawings in which:

Fig. 1 is a partial view of a tractor having apparatus embodying the invention mounted thereon with the near driving wheel removed and parts broken away to more clearly show the apparatus;

Fig. 2 is an enlarged plan view taken along line II—II in Fig. 1;

Fig. 3 is an enlarged sectional plan view of the control linkage taken along line III—III in Fig. 1;

Fig. 4 is a view taken along line IV—IV in Fig. 3;

Fig. 5 is a schematic illustration of the control system with some parts shown in section to afford a better understanding of its operation;

Fig. 6 is a sectional view showing the relation of the main valve to the passages controlled thereby when the valve is in its implement lowering position;

Fig. 7 is a view similar to Fig. 6 showing the valve positioned to allow all pumps to discharge liquid to the ram;

Fig. 8 is a partial view of the main valve and control passages showing the valve positioned to hold the implement in raised or partially raised position with all pumps discharging liquid to the return passage means; and Fig. 9 is a view similar to Fig. 8 showing the valve in its full lowering position with the valve engaging means having moved away from the end of the valve.

Referring to Fig. 1, it will be seen that the apparatus chosen to illustrate the present invention comprises generally a tractor 1 having rear driving wheels 2 and a frame 3, and an implement comprising a moldboard plow 5 attached to the tractor in rearwardly extending relation to rear driving wheels 2.

Mounted forward of and below the rear axle housing 6 is a drawbar support 7 adapted for connecting the implement to the tractor in draft transmitting relation therewith. Drawbar support 7 comprises a pair of laterally spaced plate members 8 fixed in depending relation to the underside of the tractor, as by welding, a lever 10 integrally formed with a bearing means 11 adapted for positioning same between plate members 8, and a pin 12 extending through aligned openings in the lower portions of plate members 8 and through bearing portion 11 of lever 10, thereby supporting the lever for swinging movement about pin 12. The lower portion of lever 10 is provided with a bearing means 13 supporting a pivot pin 15 which in turn is connected to and supports the forward end of a drawbar structure 16. The upper portion of lever 10, hereinafter called the draft regulating lever, is acted on by biasing means comprising a spring seat 17 rigidly fixed between upper forward portions of plate members 8 in transverse relation therewith, a compression spring 18 positioned on the seat, and a plate member 20 fixed to the opposite end of the spring for engagement with forwardly projecting portions 21 of the regulating lever. Thus it will be seen that draft force applied to the lower end of regulating lever 10 through drawbar structure 16 is opposed by the compressive force of spring 18 acting on the upper end of this lever.

Referring also to Fig. 2, it may be noted that drawbar structure 16 comprises a bar member 22, a yoke 23 and pin 25 connecting the forward end of the drawbar with pivot pin 15 carried by draft regulating lever 10 for vertical and horizontal swinging movement of the drawbar relative thereto, and an opening (not shown) in the rear portion of bar member 22 for receiving a pin 26 adapted to connect with an implement. In addition, there is provided a structure for guiding the swinging movement of the drawbar, this structure including pairs of similar parts of which only one such part is shown in Fig. 1 as it will be obvious that identical parts occupy a similar position on the opposite side of the tractor. As indicated, the guiding structure comprises a pair of vertical plate members 27 fixed to the under portion of rear axle housing 6 in depending laterally spaced and generally parallel relation with respect to each other, a pair of similar strap members 28 having their upper ends pivotally mounted on coaxially aligned pins 30 carried by plate members 27, a transverse guide bar 31 positioned between and carried by the lower end portions of strap members 28 for rotation about a transverse axis, and a guide strap 32 fixed to the rear half of bar 22, as by bolts 33, in overlying vertically spaced parallel relation therewith. Guide bar 31 and guide strap 32 coact to afford guided swinging movement of drawbar 16 in both a horizontal and vertical direction. Each strap member 28 is provided with an opening 35 adapted for alignment with a selected one of a series of openings 36 arcuately spaced along the rear portion of the adjacent plate member 27 for placing a pin 37 theretnrough to adjustably limit the lowering movement of the drawbar.

Implement 5 comprises a conventional moldboard plow 39 fixed to a forwardly extending beam 40 having a downwardly arched forward portion 41. A bar member 42 curved similarly to portion 41 of plow beam 40 is disposed in laterally spaced relation thereto, being rigidly fixed to beam portion 41 by means of plate 43 and spacing member 45. Plate 43 and member 45 interconnect bar 42 with arched portion 41 in a suitable manner such as by welding. In addition, a pair of vertically spaced strap members 46 are fixed between the rear portion of bar 42 and adjacent beam portion 41 and have aligned openings (not shown) therethrough for alignment with a similar opening (also not shown) in guide strap 32. The forward ends of beam portion 41 and bar 42 have coaxially aligned openings therethrough for receiving a pin 47. To attach implement 5 to drawbar structure 16 the forward portion of plow beam 40 is placed so that plate member 43 underlies bar 22 with the openings in straps 46 aligned with the opening in the rear portion of guide strap 32 and the pin 26 inserted therethrough. Pin 47 is then placed through the aligned openings in the forward ends of bar 42 and beam portion 41 and rests against guide strap 32 thereby preventing vertical swinging movement of the plow relative to drawbar structure 16. The above described method of attaching implement 5 to drawbar structure 16 affords a rigid connection therebetween making the combined structure movable as a unit relative to pivot pins 15 and 25.

For lifting and lowering the implement, that is vertically swinging implement 5 and drawbar 16 as a unit about the support for the latter afforded by pivot pin 15, there is provided a power lift means comprising generally a hydraulic pump 48 operatively connected to the tractor power source in any suitable manner such as the cam and follower arrangement shown schematically in Fig. 5, a ram 50 receiving fluid from the pump through a conduit 51, and a ram actuated lift mechanism operatively interconnecting ram 50 and implement 5. The lift mechanism includes a vertically disposed plate member 52 fixed to and extending rearwardly from rear axle housing 6, and a bellcrank lever pivotally attached to plate member 52 by pin 53, or other suitable means. This bellcrank lever has one arm 55 pivotally connected with the rearwardly extending piston rod 56 of ram 50, and has its other arm 57 extending rearwardly and pivotally supportedly connected with the upper end of a lift rod 58 which has its lower end pivotally connected with the underlying plow beam 40.

Looking at Fig. 1, it will be seen that draft regulating lever 10, which part is movable in response to a draft load imposed on drawbar 16 as previously explained, is connected with the hydraulic pump unit 48 through a link 60 having a pivotal connection with the upper end portion of lever 10 and a lost motion connection (pin and slot) with an arm 61 extending from the pump control housing 62. Thus it is apparent that drawbar 16 is operatively connected with hydraulic pump 48 and it will be seen further along in the disclosure how this connection controls the action of the pump.

Referring now to Fig. 5, which is a schematic illustration of pump 48 and of the controls therefor it will be seen that this apparatus comprises generally a source of liquid 63, a plurality of pumps 65 (four in this case) each having communication with the source 63, a control valve 66, and a pressure relief means 67. The pumps, which are a plunger type, have cam followers 68 for engagement with cam portions 70 of a power driven shaft 71, and each pump has a discharge passage 72 communicating with control valve chamber 73. In addition, there is provided a separate chamber 74 which serves as a discharge manifold and communicates with control valve chamber 73 through check valve controlled passages 76 conforming in number to pump discharge passages 72. And in this connection it should be noted that passages 72 communicate with valve chamber 73 in diametrically opposed relation to passages 76. Discharge manifold 74 communicates at its right hand end with a check valve controlled outlet passage 77 through which working fluid is carried to a pressure actuated device such as ram 50.

Looking again at control valve chamber 73 it will be seen that a cylindrical liner comprising axially separable sections 80 to 84 is disposed in the cylindrical control valve chamber with the end sections 80 and 84 being held in place by cover plates 86 and 87, respectively. Cylindrical sections 80 to 84 are provided with circumferential external grooves 88 placing pump discharge passages 72 in communication with the check valve controlled passages 76. In addition each section is provided with transverse bores 90 placing the interior thereof in communication with the diametrically opposed pairs of passages 72 and 76. Furthermore, the end abutting portions of cylindrical sections 80 to 84 have parts thereof cut away and shaped to afford circumferential external grooves 91, rectangular in cross section, each of which communicates with the interior of the chamber formed by these sections through diametrically opposed transverse passages 92. The rectangular external passages 91 formed between end portions of cylindrical liner sections 80 to 84 communicate with exhaust passages 93 which in turn communicate with a main return passage 95 leading to the fluid source or reservoir 63. In addition, the innermost cylindrical section 84 is provided with two additional circumferential external grooves 96 and 97, groove 97 communicating with ram outlet passage 98 and with a transverse bore 100 placing diametrically opposed portions of groove 97 in communication with the interior of section 84, whereas groove 96 communicates with a passage 101 which in turn communicates with the right hand end of main fluid return passage 95. Groove 96 also communicates with the interior of liner section 84 through diametrically opposed transverse bores 102.

A cylindrical control valve 66 is positioned in the generally cylindrical chamber formed by the end abutting liner sections 80 to 84 and preferably this valve is formed by a series of separable cylindrical elements 104 to 107, inclusive, disposed in end abutting relation, the end abutting portions of these cylindrical valve elements being reduced to form annular spaces between same and the surrounding internal surfaces of the liner sections. In this connection it should be noted that the right hand or innermost valve element 107 comprises an intermediate reduced portion 108 uniting enlarged cylindrical portions 110 and 111 which in turn terminate in reduced oppositely projecting end portions, the inner one of which abuts the reduced portion of adjacent element 106 and the other of which projects through a coaxial opening 112 in cover plate 87 (see Fig. 3). The valve elements are held in end abutting relation for movement as a unit by means of a compression spring 113 seated on valve element 104 in surrounding relation to the reduced outer end portion thereof with its opposite end abutting the inner surface of cover plate 86. Movement of the valve element to the left as viewed in Fig. 5 may be adjustably limited through the medium of an inwardly projecting part 115 carried by cover member 86, this part having an internally threaded bore 116 extending therethrough in which is adjustably mounted a screw threaded element 117 having a reduced end portion 118 disposed in coaxial abutting relation with respect to a similar projection on the adjacent valve element 104. The outer exposed end of element 115 is provided with a knurled knob 120 to facilitate adjustment thereof.

Looking now at the top portion of Fig. 5 it will be noted that the pump unit includes a second cylindrically shaped chamber 67 including parts operative as a pressure relief and unloading means. This unloading chamber communicates with the left hand end of discharge manifold space 74 by means of a passage 121 and an intermediate portion of this unloading chamber also communicates with a fluid return passage 122 having communication with reservoir 63. The left end portion 123 of unloading chamber 67 is somewhat enlarged to provide an internal shoulder 125 against which is positioned a disk type spring seat 126 having an opening 127 therethrough. The opposite or left hand end of chamber portion 123 is closed by a cylindrical plug element 128 having an inner end portion 130 of reduced diameter projecting axially toward spring seat 126 in spaced relation with respect to the surrounding wall of chamber 67. The outer or left hand end of plug element 128 abuts and is kept in place by cover plate 86. The left hand end of plug member 128 is provided with a circumferential external groove 131 communicating with passage 121 leading thereto from manifold 74. A transverse bore 132 connects diametrically opposed portions of groove 131 with a central bore 133 which extends inward from transverse bore 132 and coaxially through the reduced portion 130 of plug member 128. Central bore 133 is somewhat enlarged from a point adjacent transverse bore 132 to the discharge side thereof to provide a seat for ball valve 135 and to receive a cylindrical valve element 136. A cylindrical spring seat element 137 slidably surrounds the reduced end portion 130 of plug member 128 and is provided at its open end with a peripheral flange 138 slidably engaging the internal surface of unloading chamber portion 123, this flange also affording a seat for a compression spring 140 disposed between same and disk seat 126. The inner end of element 137 is provided with an internal recess forming a cylindrical seat 141 receiving the inner end of cylindrical valve element 136 which, through the action of spring 140, acts to hold this valve element and ball valve 135 in a passage closing position, that is, with the ball valve firmly engaged with its seat thereby preventing a flow of fluid therepast from manifold 74. And when thus positioned, the flanged end portion 138 of spring seat element 137 is spaced from the oppositely facing shoulder presented by plug member 128. The reduced portion 130 of plug member 128 is provided with a transverse bore 142 therethrough and is further reduced from its junction with the main portion of the plug member 128 inward to a point beyond transverse bore 142 so as to provide an annular relief passage 143 which communicates with the spring housing portion of chamber 67 through one or more axial slots 145 in the peripheral edge portion of flange 138. Cylindrical valve element 136 is also provided with an axial bore 146 extending from the ball valve end thereof approximately to its midpoint where it communicates with a circumferential groove 147 adapted to place the space between the end of valve element 136 and the seat for ball valve 135 in communication with the transverse bore 142 in plug member portion 130, thus providing a relief passage means for the space surrounding ball valve 135 when seated. Also, the inner end portion of cylindrical spring seat element 137 is provided with transverse bore 148 therethrough for relief of any liquid accumulating between same and the inner end of plug member reduced portion 130.

The right hand end of unloading chamber 67 mounts a cylindrical spring seat 150 and is closed by cover plate 87. A pressure responsive piston 151 is mounted in unloading chamber 67 in downstream relation with respect to spring seat disc 126 and is detachably connected (not shown) with a movement transmitting rod 152 which extends coaxially through cylindrical spring seat 150 and through an aligned opening 153 (see Fig. 4) in cover plate 87. Referring also to Fig. 3 it will be seen that the outer or exposed end of control rod 152 is fixedly connected with and carries a stub shaft 155 which projects at a right angle therefrom in the direction of valve chamber 73 and in generally parallel relation to cover plate 87. A compression spring 156 (Fig. 5) is interposed between seat 150 and the opposed end of piston 151 in surrounding relation to piston rod 152, this spring acting to move the piston toward the left in closed relation with respect to fluid return passage 122. It will be noted that the right hand end of unloading chamber 67 is provided with another fluid return passage 157 having communication with reservoir 63 and functioning to return any liquid which may become trapped between piston 151 and cylindrical spring seat 150.

As seen in Figs. 3 and 4, it will be apparent that shaft 155 carried by control rod 152 operatively mounts a sleeve 158 having an enlarged portion 160 positioned in opposed engaged relation with respect to the reduced end portion of the innermost valve element 107 which extends through cover plate 87. A motion transmitting means comprising a plurality of associated elements positioned within housing 62 operatively connects shaft 155 with shaft regulating link 60. More particularly, a first element, lever 161, has its upper end portion fixedly secured to sleeve 158 for rotating movement therewith relative to shaft 155, and a second element, link 163, has one end pivotally connected to an intermediate portion of lever 161. The other end of link 163 is pivotally connected with an arm 165 fixed to an inner end portion of a shaft 166 rotatably supported in a bearing structure 167 carried by control linkage housing 62. A third element, cam lever 185, has a lost motion pivotal connection at one end (pin 187 and slot 188) with the lower end portion of lever 161, that is, the end remote from shaft 155. The other end of cam lever 185 is fixed to a shaft 183 rotatably mounted in a bearing means (not shown) carried by housing 62. A fourth element, arm 181, fixed at one end to a shaft 176 rotatably supported by the linkage housing has a pin 182 at its free end adapted and positioned for engagement with a curved edge 186 of cam lever 185. All of these elements are disposed within housing 62 which is detachably secured in abutting sealed relation against cover plate 87 by means of cap screws 168 or the like.

The outer end of shaft 166 has an arm 170 fixed thereto which in turn is connected through a link 171 with a suitable manually actuable control lever 172 (Fig. 1) carried by the tractor steering column 173 and associated with a quadrant 175 (Fig. 5). The portion of shaft 173 projecting outside of housing 62 has a triangular arm 61 fixed thereto at one apex with another apex thereof connected with draft regulating link 60 by means of a pin 178 which slidably engages a slot 180 in the adjacent end of link 60. And in this connection it should be noted that the third apex of arm 61 carries a lockout screw 190 engageable with an internally threaded bore 191 in the lower portion of housing 62. For readily turning screw 190 a knurled knob 192 is provided, and a spring 193 (Fig. 3) is positioned between knob 192 and arm 61 for urging screw 190 outwardly and thus preventing displacement of same due to vibration of the pump and control unit, this being particularly useful when said unit is mounted on a tractor.

From the foregoing description it should be apparent that manual control lever 172 may be moved so as to shift the fulcrum for lever 161, that is the fulcrum 162 afforded by the connection of link 163 to an intermediate portion of lever 161, and thereby move the top of lever 161 relative to cover plate 87. Also, movement of draft regulating link 60 transmitted through arms 61 and 181 and lever 185 causes a swinging movement of lever 161 about the fulcrum point 162. More specifically, spring 156 in unloading chamber 67 is relatively strong as compared with the spring 113 acting on control valve 66 and consequently control rod 152, stub shaft 155 and valve 66 tend to assume the positions shown in Figs. 3 and 4. Therefore, the above mentioned position (shown also in Fig. 7) of valve 66, control rod 152 (and consequently piston 151) may be changed either (1) by moving manual control lever 172 to effect a shifting of fulcrum 162 in a direction away from cover plate 87 and thus pivot lever 161 about pin 187, or (2) by a movement of draft regulating link 60 away from pump control housing 62 causing pin 182 to engage cam lever 185 and thus swing lever 161 in a clockwise direction about its fulcrum 162. Either of these actions move rod 152 and piston 151 toward the right, as viewed in Fig. 5, which in turn compresses spring 156. As a result of such movement spring 113 urges control valve 66 toward the right and acts to maintain the reduced right hand end of this valve in engagement with roller 160. Movement of the valve in the direction just described, that is, toward the right is limited by engagement of the enlarged portion 111 of valve element 107 with cover plate 87.

When operating with the parts positioned to obtain maximum lifting effect, that is, in their full lift position wherein hand control lever 172 is in position A (Fig. 5), wherein the control linkage is positioned as shown in Figs. 3 and 4, and valve 66 is positioned as shown in Fig. 7, it will be noted that the enlarged cylindrical portions of the valve elements 104 to 107, inclusive, close transverse bores 90 and that, therefore, the pumps are severally connected with manifold bore 74 through passages 72, external grooves 88, and through check valve controlled passages 76. The liquid entering manifold space 74, assuming all liquid has been drained from the ram 59, flows therefrom through check valve controlled passage 77 and quickly attains a pressure sufficient to rapidly effect a weight lifting power stroke or expansion of the ram unit. When this occurs the pressure of the liquid in the manifold space 74 continues to increase until the pressure attained is sufficient to unseat pressure relief ball valve 135 whereupon the check valve assembly comprising ball valve 135 and cylindrical valve element 136 moves toward the right compressing spring 140 until valve element 136 opens transverse pressure relief bore 142. This permits pressure fluid to flow through bore 142 and into annular space 143, then through the axial passages 145 in the periphery of flange portion 138 of spring seat element 137, then into the spring housing chamber from which it flows through the opening 127 in disc spring seat 126 and into the space between this seat and the head of piston 151. This pressure fluid then acts on piston 151 and moves same toward the right thereby opening relief passage 122 which is in communication with the liquid source 63. This movement of piston 151 results in a movement of control rod 152 toward the right sufficient to bring the lower end of lever 161 into engagement with the side of cover plate 87 which engagement limits the movement of the piston 151 and control rod 152 in this direction. As a result spring 113 causes control valve 66 to move toward the right in following engaged relation to enlarged part 160 of sleeve 158 and to the position indicated in Fig. 5. In this, the pump unloading position, the enlarged bore controlling portions of valve elements 104 to 106, inclusive, place transverse bores 90 in the associated liners in communication with the main return passage 95. However, it should be noted that the enlarged portions 110 and 111 of valve element 107 remain in closed relation with respect to associated transverse bores 90 and 100, respectively, and therefore the associated pump 65 continues to deliver fluid through circumferential groove 88 and into manifold space 74 through the associated check valve controlled passage 76.

In the absence of excessive leakage, more particularly leakage through the flexible hose 51 and the connections between such hose and the ram cylinder and pump housing, main control valve 66 will remain in its unloading position until either fulcrum 162 of lever 161 is shifted by actuation of manual control lever 172, or until a change in draft force moves regulating link 60 to cause cam lever 185 to swing lever 161 about its fulcrum 162, and with control valve 66 in its unloading position the hydraulic ram unit 50 will remain in its extended weight lifting position, but if for any reason the pressure in manifold space 74 should decrease below that necessary to hold ball valve 135 and cylindrical relief valve 136 in their passage opening position these valves will close the relief passage means 121 and as the liquid drains from the space ahead of piston 151, spring 156 will move piston 151 and control rod 152 to the left thus repositioning the main control valve 66 to connect all pumps to manifold 74, this initial position of main control valve 66 being determined, as previously indicated, by the position of manual control lever 172.

However, if with the control valve 66 in either its full lift or unloading position, previously described, it becomes desirable to lower the weight or implement 5 all that has to be done is to move manual control lever 172 to a lowering position, that is, a position in the range B—D on the quadrant 175 shown in Fig. 5. Movement in this direction is effective to shift fulcrum 162 for lever 161 away from cover plate 87 a distance sufficient to permit spring 113 to move main control valve 66 to the right until the discharge sides of all pumps and the ram relief passage means 98 and 100 are in communication with return passages 93 and 101, respectively, which in turn are in communication with the return passage means 95. Under these conditions liquid rapidly drains from the ram circuit, ram piston 195 moving to its retracted position through gravity action of the weight or other means actuated thereby. In other words, if the weight were to be considered as representing an agricultural implement or other load, a movement of valve 66 to its lowering position shown in Figs. 6 and 9 rapidly drops the implement to the ground. If, however, it is desired to gradually lower the weight or implement onto the ground, this can be readily accomplished simply by moving valve 66 so as to just barely open the passage means 100 placing the ram relief passage 98 in communication with the return passage means 101 and 95. And if, in this connection, it should be desired to place all pumps in communication with the return passage means 95 through passages 93 and yet retain the ram in its extended position, this can be readily accomplished by manually shifting fulcrum 162 of lever 161 so as to position main control valve 66 as indicated in Fig. 8. When thus positioned it will be seen that the enlarged portion 111 of the cylindrical control valve section 107 closes the transverse bore 100 to prevent placing the ram relief passage 98 in communication with the return passage means 101.

It should also be obvious that in addition to the various positions of the main control valve hereinbefore described, valve 66 may also be positioned by a manual shifting of the fulcrum 162 for lever 161 so as to, if desired, effect a ram expanding action by connecting the discharge sides of one or more pumps with the check valve controlled passages 76 connecting same with manifold space 74. And while it is normally intended that the enlarged cylindrical portions of main control valve 66 will be positioned so as to either open or close the radially extending transverse bores or passages 90 and 100, placing the circumferential external grooves 88 and 97 in communication with the interior of the valve chamber formed by liner sections 80 and 84, inclusive, it should be obvious that the valve elements may be positioned so as to only partially open one or more of the transverse passages 90 and 97. Furthermore, it should be apparent that while the particular arrangement of the passages and valve elements herein shown for purposes of illustration constitutes a preferred embodiment of the present invention, other arrangements can be readily made as desired simply by changing the axial spacing of the control passages 90, 92, 100 and 102, circumferential grooves 88, 91, 96 and 97 and/or the axial length of the enlarged passage controlling portions of valve elements 104 to 107, inclusive.

Referring generally now to Figs. 1 and 5, the operation of apparatus embodying the present invention will be described with specific reference to other figures being made as the description progresses. Assuming that manual control lever 172 has been moved to position A on quadrant 175 (this shifts the fulcrum 162 of lever 161 to its limiting position nearest cover plate 87) and that the attached plow 5 is in its transport or fully raised position to begin with, the action of the apparatus will be described as the plow is lowered to the ground and assumes a soil working position. When the implement has been fully raised valve 66 will have moved to its unloaded position (Fig. 5) and the lower end of lever 161 will have moved from its position shown in Fig. 4 to a position abutting cover plate 87. To lower the implement the operator moves the manual control lever 172 from position A to a "lowered" position (somewhere in range B—D), for example, the position designated D in Fig. 5, wherein control valve 66 assumes the position shown in Fig. 9 with all pumps delivering through transverse passages 90 and 92, grooves 91 and passages 93 back to the source 63 and the ram discharge passage 98 has commuication with ram relief passage 101 through control valve chamber 73. Movement of control lever 172 to this "full lower" position, i. e. to position D on Fig. 5, pivots lever 161 about pin 187 in a clockwise direction thereby moving stub shaft 155 and sleeve portion 160 to the right and away from control valve 66 which is also moved by the action of spring 113 to its farthermost position to the right as shown in Fig. 9. The weight of the implement then forces ram piston 195 back to its retracted position (not shown) and the implement rests on the soil.

Having determined through pervious experience the amount of draft which gives a desired depth of soil penetration for the plow in a particular field, the operator next sets control lever 172 to that predetermined position on quadrant 175; that is, to a position within the draft regulating range designated B—D. This in effect shifts fulcrum 162 back to the left to a point intermediate its limiting positions thereby causing sleeve portion 160 to approach cover plate 87 and to approach or contact the adjacent end of valve 66, lever 161 being once more pivoted counterclockwise about pin 187. As previously indicated, this selected position will be in the lowering range of the control valve travel with no pumps delivering to manifold 74. When the tractor moves forward the point of the plow enters the ground and a tensive draft force is transmitted through drawbar structure 16 to the lower portion of draft regulating lever 10. This application of force increases as the plow goes deeper into the ground and, as a result, lever 10 pivots against the resistance offered by spring 18 thereby moving draft regulating link 60 forward so that the left end of slot 180 therein tends to move away from pin 178 on arm 61. Actually, however, the spring 156 surrounding control rod 152 causes pin 178 to follow the left end of slot 180 in its movement. That is, spring 156 which always tends to move the upper end of lever 161 in to abutting relation with cover plate 87 is dominated by the action of spring 18 which under no load holds slot 180 in a fixed position which by virtue of the coaction of the pin 178, arm 181 and lever 185 prevents clockwise movement of lever 161. However, when force is applied to drawbar 16 compressing spring 18 draft regulating link 60 moves forward (to the left as viewed in Figs. 1, 4 and 5) thereby allowing pin 178 to move upward to the left which permits arm 61, shaft 176 and arm 181 to move counterclockwise so that downward movement of pin 182 permits counterclockwise movement of lever 185 and consequently lever 161, the latter turning about its adjustable fulcrum or pin 162. This movement is accordingly limited by the enlarged sleeve portion 160 striking cover plate 87 or by cessation of movement of draft regulating link 60 due to its having reached the normal position for any given load on the drawbar.

The counterclockwise movement of lever 161 operates to bring the enlarged sleeve portion 160 on shaft 155 into engagement with the adjacent end of valve 66 thereby moving same to the left and into an implement raising position, the extent of such movement depending on the position of fulcrum 162 as determined by the selected position of manual lever 172. As the implement lifts due to one or more pumps delivering liquid to ram unit 50, the draft force transmitted to lever 10 decreases and as a result spring 18 will move link 60 rearwardly thereby turning shaft 176 and the arms 61 and 181 thereon in a clockwise direction which in turn effects a similar movement of lever 161 about its fulcrum 162. And it should now be obvious that this resulting movement of lever 161 permits spring 113 to move valve 66 to an implement lowering position conforming with the decrease in draft force and the position of hand lever 172.

In connection with the above described movements of the linkage in control housing 62, it will be noted that the edge portion 186 of lever 185 which is engaged by pin 182 is in effect a cam and this construction affords a coaction of parts which is very advantageous in a draft regulating system. As shown in Fig. 3, the parts in housing 62 are positioned with control valve 66 in full lift (lever 172 at point A in Fig. 5) and no load is being transmitted through draft regulating link 60. As load is applied to drawbar 16 and regulating link 60 moves to the left, lever 181 is permitted to move in a counterclockwise direction as previously described. The curved edge portion 186 of cam lever 185 is so designed that this counterclockwise movement of lever 181 results in an increasingly greater movement of pivot 187 (between lever 161 and cam lever 185) to the right for the same amount of movement of draft regulating link 60. Practically speaking this means that for any given setting of manual control lever 172 the variation in force at the drawbar necessary to effect a regulating movement of control valve 66 will be a predetermined percent of the draft at that setting. Assuming cam surface 186 as shown is designed for a regulation of draft within ten percent, then for a setting of hand lever 172 for say a draft of 700 lbs. it will take an increase or decrease in draft of 70 lbs. before any regulating movement of main control valve 66 will be effected, whereas for a draft setting of 2500 lbs. on quadrant 175 it will take a variation of 250 lbs. in draft force before movement of control valve 66 is effected. The result of this "variable response" afforded by the present invention may be more clearly explained by comparing the action of a plow in extreme soil conditions. When plowing in very light soil at a given depth an increase in draft of 70 lbs. may be sufficient to cause the plow to raise ½ inch, whereas in plowing extremely heavy soil at the same depth it may take an increase of 250 lbs. to raise the plow ½ inch. It will be obvious, therefore, that although a control apparatus which is responsive to a definite amount of change in draft force could operate satisfactorily for uniform soil conditions and depth, any material change in said conditions would produce an undesirable "hunting" effect wherein the hydraulic lift is continually operating and the plow is being raised or lowered too much with respect to the desired depth.

In traveling through a field wherein the type and condition of the soil are uniform, lever 161 will operate as hereinbefore described and assume a generally stable position at which the draft force balances the lift force produced by the pumps. However, should the type and/or condition of the soil vary materially and it is desirable to plow at the same depth as before, a manipulation of manual control lever 172 is necessary. For example, if the soil becomes heavier, hand lever 172 should be shifted toward point D in the draft regulating range thus moving fulcrum 162 further toward the right as viewed in Figs. 4 and 5, whereas if the soil become light, lever 172 should be shifted toward point B. In

13 this connection it is to be understood that whenever hand lever 172 is positioned in the range A—B one or more of the pumps are operating to deliver liquid to ram unit 50 and when this lever is positioned at point B, or immediately adjacent thereto within a very small range, all pumps are delivering to return passages 93 and ram relief passage 100 is closed (this being the "hold" position shown in Fig. 8). Further movement of lever 172 within range B—C opens ram relief passage 100 permitting fluid in the ram 50 to return to source 63.

Therefore, it should be obvious that the rate at which an implement can be raised or lowered depends upon the position selected for lever 172 within the ranges A—B and B—C, respectively, that when the lever is within range A—B and adjacent point A the rate of lifting is a maximum, and that when the lever is within range B—C and adjacent the "hold" position described above the rate of lowering is a minimum and as lever 172 is moved downwardly away from this "hold" position the rate of lowering increases until it reaches a maximum at point C. Movement of hand lever 172 past point C and toward point D operates to merely move shaft 155 and sleeve portion 160 (attached to the upper end of lever 161) away from the adjacent end of valve 66 and toward the extreme position indicated in Fig. 9, valve 66 being prevented from then following sleeve portion 160 by engagement of its enlarged portion 111 with the inner side of cover plate 87. Consequently, if hand lever 172 be positioned between points C—D, the draft force necessary to bring sleeve portion 160 into operative engagement with the adjacent end of valve 66 is determined and varied in accordance with the selected position of this lever. This is an important feature in that it affords an effective range of draft regulation without effecting a preloading of spring 18 which acts on lever 10 in opposition to the draft induced force thereon. However, if desired, spring 18 may be preloaded thereby increasing the effective range of draft regulation to include all positions of lever 172 between points B and D.

In performing certain operations it is sometimes desirable to have the action of the hydraulic pump controlled entirely by the operator and for this reason there is provided the lockout means described hereinabove (see Figs. 3 and 4) by which arm 61 is fixed to the control linkage housing 62 and movement of draft regulating link 60 is then ineffective to alter the position of control valve 66. With arm 61 thus fixed in position pin 187 becomes a fixed pivot for lever 161 and action of control valve 66 is controlled through operation of hand lever 172.

Another feature of considerable importance is the arrangement of parts so as to afford relative movement between lever 161 and main control valve 66. This relative movement has the effect of preloading spring 18, as mentioned above, without actually so doing and therefore increases the range of effective draft regulation afforded by the system. This feature of construction also affords an additional advantage in that it permits simultaneous movement of valve 66 and lever 161 when needed, particularly in the previously described unloading action of the pump when control rod 152, shaft 155 and lever 161 move to the right and control valve 66 follows under the compressive force of spring 113.

It is so important, particularly in draft regulation of soil working implements, that the hydraulic lift respond to a lesser variation in draft

14 force when working with light soil than with heavy soil, and this is made possible in the present invention through the particular arrangement of control linkage parts and more specifically is due to the cam lever 185 which co-acts with pin 182 in a manner such that as the draft force increases the resulting movement of control valve decreases.

And it should be obvious that although the present invention has been described with particular reference to an automatic draft regulating apparatus, it is equally adaptable for use with any device employing a part which is to be regulated in its movement or controllably positioned in accordance with the amount of load imposed on or carried by said device. And it should, therefore, be understood that it is not intended to limit the invention to the exact constructions, combinations and/or subcombinations herein shown and described as various modifications within the scope of the appended claims may occur to those skilled in the art.

It is claimed and desired to secure by Letters Patent:

1. In an automatic draft control for a ground working implement operated through means including a pump, a hydraulic motor connected with said implement, a valve movable throughout a predetermined range for controlling the flow of fluid to and from said motor, and a movable part responsive to variations in an implement induced draft force applied thereto, the combination of a linkage operatively connecting said valve and movable part comprising a first lever movably supported with a first portion thereof disposed for operative engagement with said valve, a second lever mounted for swinging movement and having a portion thereof operably connected with a second portion of said first lever remote from said first portion affording relative swinging movement therebetween and rendering said first lever actuable by said second lever, a manual control lever, a link connecting said manual control lever with said first lever intermediate said first and second portions and affording a fulcrum for said first lever which is selectively shiftable by actuation of said manual control lever, said first lever constituting a common means operatively connecting said second and manual levers in motion transmitting relation to said valve and rendering said manual lever actuable to position said first portion of said first lever in a preselected extent of lost motion relation to a limiting position of said valve whereby said second lever must then move an amount proportional to said preselected extent before imparting motion to said valve, and means operatively connecting said second lever with said movable part.

2. In an automatic draft control for a ground working implement operated through means including a pump, a hydraulic motor connected with said implement, a valve movable throughout a predetermined range for controlling the flow of fluid to and from said motor, and a movable part responsive to variations in an implement induced draft force applied thereto, the combination of a linkage operatively connecting said valve and movable part comprising an elongated first lever having one end portion pivotally connected with a movable support and positioned thereby for operative engagement with said valve, a second lever mounted for swinging movement and having a portion thereof operably connected with the other end portion of said first lever affording relative swinging movement therebetween and rendering same actuable by said second lever, a manual control lever, a link connecting said manual control lever with said first lever intermediate said end portions and affording a fulcrum for said first lever which is selectively shiftable by actuation of said manual control lever, biasing means urging said first lever to pivot about said fulcrum in a predetermined direction, said first lever constituting a common means operatively connecting said second and manual levers in motion transmitting relation to said valve and rendering said manual lever actuable to position said first portion of said first lever in a preselected extent of lost motion relation to a limiting position of said valve whereby said second lever must then move an amount proportional to said preselected extent before imparting motion to said valve, and means operatively connecting said second lever with said movable part.

3. In an automatic draft control for a ground working implement operated through means including a pump, a hydraulic motor connected with said implement, a valve for controlling the flow of fluid to and from said motor, and a movable part responsive to variations in an implement induced draft force applied thereto, the combination of a linkage operatively connecting said valve and movable part comprising an elongated first lever having one end portion pivotally connected with a movable support and positioned thereby for operative engagement with said valve, a manual control lever, a link connecting said manual control lever with said first lever at an intermediate portion thereof and affording a fulcrum for said first lever, a second lever mounted for swinging movement and having a portion thereof operably connected with the other end portion of said elongated lever affording relative swinging movement of said first lever and rendering same actuable by said second lever, a swingable arm having its free end portion disposed for sliding engagement with an edge of said second lever, said arm being operably connected with said movable part, and biasing means urging said movable support in a predetermined direction.

4. In an automatic draft control for a ground working implement operated through means including a pump, a discharge passage for said pump, a hydraulic motor connected with said implement and receiving fluid from said passage, a valve for controlling the flow of fluid to said discharge passage, a pressure relief and unloading means including an element movable in response to attainment of a predetermined pressure in said discharge passage, biasing means urging said movable element in a predetermined direction, and a movable part responsive to variations in an implement induced draft forced applied thereto, the combination of a linkage operatively connecting said valve, unloading means and movable part comprising a first lever having one end portion thereof pivotally connected with said movable element of said unloading means for movement therewith and disposed for operative engagement with said valve, said movable element actuating said first lever in response to attainment of said predetermined pressure to thereby move said valve to a position wherein less fluid is being delivered to said discharge passage, a manual control lever, a link connecting said manual control lever with said first lever at an intermediate portion thereof and affording a fulcrum for said first lever, a second lever mounted for swinging movement and having a portion thereof operably connected with the other end portion of said first lever affording relative swinging movement of said first lever and rendering same actuable by said second lever, and means operably connecting said second lever with said movable part.

5. In an automoatic draft control for a ground working implement operated through means including a pump, a discharge passage for said pump, a hydraulic motor connected with said implement and receiving fluid from said passage, a valve for controlling the flow of fluid to said discharge passage, a pressure relief and unloading means including an element movable in response to attainment of a predetermined pressure in said discharge passage, biasing means urging said movable element in a predetermined direction, and a movable part responsive to variations in an implement induced draft force applied thereto, the combination of a linkage operatively connecting said valve, unloading means and movable part comprising, a first lever having one end portion thereof pivotally connected with said movable element of said unloading means for movement therewith and disposed for operative engagement with said valve, said movable element actuating said first lever in response to attainment of said predetermined pressure to thereby move said valve to a position wherein less fluid is being delivered to said discharge passage, a manual control lever, a link connecting said manual control lever with said first lever at an intermediate portion thereof and affording a fulcrum for said first lever, a second lever mounted for swinging movement and having a portion thereof operably connected with the other end portion of said first lever affording relative swinging movement of said first lever and rendering same actuable by said second lever, and a swingable arm having its free end portion disposed for sliding engagement with an edge of said second lever, said arm being operably connected with said movable part.

6. In a control apparatus having a pump, a valve controlling the flow of fluid from said pump, and a movable part responsive to variations in a force applied thereto, the combination of a linkage operatively connecting said valve and movable part comprising, a first lever movably supported with one end portion thereof disposed for operative engagement with said valve, a first arm pivotally connected to an intermediate portion of said first lever and affording a fulcrum for the latter, biasing means urging said first lever to swing in a predetermined direction about said fulcrum, a second lever mounted for swinging movement and having a portion thereof operably connected with the other end portion of said first lever affording relative swinging movement of said first lever and rendering same actuable by said second lever, a swingable arm coacting with said movable part and second lever to afford a relatively movable motion transmitting connection therebetween, and means positionable to render said swingable arm ineffective to transmit motion between said movable part and said second lever thereby affording relative independent movement of said first lever and movable part.

7. In a control apparatus having a pump, a valve controlling the flow of fluid from said pump, and a movable part responsive to variations in a force applied thereto, the combination of a linkage operatively connecting said valve and movable part comprising, a first lever movably supported with one end portion thereof disposed for operative engagement with said valve, a manual control lever, a link connecting said manual control lever, a link connecting said manual control lever with said first lever at an intermediate portion thereof and affording a fulcrum for said first lever, a second lever mounted for swinging movement and having a portion thereof operably connected with the other end portion of said first lever affording relatively swinging movement of said first lever and rendering same actuable by said second lever, and means operatively interconnecting said movable part and said second lever to afford a relatively movable motion transmitting connection therebetween, said means including an element selectively flexible in a position rendering said means incapable of transmitting motion from said movable part to said second lever.

8. In a control apparatus having a pump, a valve controlling the flow of fluid from said pump, and a movable part responsive to variations in a force applied thereto, the combination of a linkage operatively connecting said valve and movable part comprising, a first lever movably supported with one end portion thereof disposed for operative engagement with said valve, a first arm pivotally connected to an intermediate portion of said first lever and affording a fulcrum for the latter, biasing means urging said first lever to swing in a predetermined direction about said fulcrum, a second lever mounted for swinging movement and having a portion thereof operably connected with the other end portion of said first lever affording relative swinging movement of said first lever and rendering same actuable by said second lever, said second lever including a curved edge portion, a swingable arm including a portion positioned for sliding engagement with said curved edge portion of said second lever, said swingable arm coacting with said movable part to transmit motion thereof to said second lever, and means positionable to render said swingable arm ineffective to transmit motion between said movable part and said second lever thereby affording relative independent movement of said first lever and movable part.

9. In a control apparatus having a pump, a valve controlling the flow of fluid from said pump, and a movable part responsive to variations in a force applied thereto, the combination of a linkage operatively connecting said valve and movable part comprising, a first lever movably supported with one end portion thereof disposed for operative engagement with said valve, a manually controllable lever mounted for swinging movement about a first axis, a link connecting said manually controllable lever with said first lever at an intermediate portion thereof and affording a fulcrum for said first lever, a second lever mounted for swinging movement about a second axis spaced from and generally parallel to said first axis, said second lever having a portion thereof operably connected with the other end portion of said first lever affording relative swinging movement of said first lever and rendering same actuable by said second lever, and a swingable arm mounted for movement about a third axis spaced from and generally parallel to said first and second axes, said swingable arm having a portion thereof slidably engaging an edge portion of said second lever and being operatively connected with said movable part.

10. In an automatic draft control for a ground working implement operated through means including a pump, a discharge passage for said pump, a hydraulic motor connected with said implement and receiving fluid from said passage, a valve for controlling the flow of fluid to said discharge passage, a pressure relief and unloading means including an element movable in response to attainment of a predetermined pressure in said discharge passage, biasing means urging said movable element in a predetermined direction, and a movable part responsive to variations in an implement induced draft force applied thereto, the combination of a linkage operatively connecting said valve, unloading means and movable part comprising, a first lever having one end portion thereof pivotally connected with said movable element of said unloading means for movement therewith and disposed for operative engagement with said valve, said movable element actuating said first lever in response to attainment of said predetermined pressure to thereby move said valve to a position wherein less fluid is being delivered to said discharge passage, a manually controllable lever mounted for swinging movement about a first axis, a link connecting said manually controllable lever with said first lever at an intermediate portion thereof and affording a fulcrum for said first lever, a second lever mounted for swinging movement about a second axis spaced from and generally parallel to said first axis, said second lever having a portion thereof operably connected with the other end portion of said first lever affording relative swinging movement of said first lever and rendering same actuable by said second lever, a swingable arm mounted for movement about a third axis spaced from and generally parallel to said first and second axes, said swingable arm having a portion thereof slidably engaging an edge portion of said second lever, and means operatively interconnecting said movable part and said swingable arm comprising parts coacting to transmit movement of said movable part to said swingable arm and coacting to afford movement of said first and second levers in response to action of said unloading means.

WALTER F. STREHLOW.
IGOR KAMLUKIN.

REFERENCES CITED

The following references are of record in the file of this patent:

UNITED STATES PATENTS

| Number | Name | Date |
| --- | --- | --- |
| 1,402,648 | Pfanhauser | Jan. 3, 1922 |
| 2,118,181 | Ferguson | May 24, 1938 |
| 2,356,231 | Ferguson | Aug. 22, 1944 |
| 2,405,980 | Sands et al. | Aug. 20, 1946 |